United States Patent
Ikeda et al.

(10) Patent No.: US 9,899,901 B2
(45) Date of Patent: Feb. 20, 2018

(54) COIL AND METHOD OF MANUFACTURING COIL

(71) Applicant: Sumitomo Heavy Industries, Ltd., Tokyo (JP)

(72) Inventors: Takashi Ikeda, Kanagawa (JP); Doutaro Usui, Kanagawa (JP); Kotaro Wada, Kanagawa (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 14/972,759

(22) Filed: Dec. 17, 2015

(65) Prior Publication Data

US 2016/0105087 A1    Apr. 14, 2016

Related U.S. Application Data

(63) Continuation of application No. PCT/JP2014/058936, filed on Mar. 27, 2014.

(30) Foreign Application Priority Data

Jun. 27, 2013   (JP) .................. 2013-135275

(51) Int. Cl.
*H02K 15/04*   (2006.01)
*H02K 3/04*   (2006.01)
*H02K 41/02*   (2006.01)

(52) U.S. Cl.
CPC .............. *H02K 15/04* (2013.01); *H02K 3/04* (2013.01); *H02K 41/02* (2013.01)

(58) Field of Classification Search
CPC .................................................. H02K 15/04
USPC ................. 310/12.22; 29/596, 598
See application file for complete search history.

(56) References Cited

U.S. PATENT DOCUMENTS

2009/0267441 A1* 10/2009 Hiramatsu ........... H02K 15/066
                                                          310/208

FOREIGN PATENT DOCUMENTS

| JP | 2001-103725 A | 4/2001 |
| JP | 2006-295106 A | 10/2006 |
| JP | 2008-283763 A | 11/2008 |
| JP | 2012-157183 A | 8/2012 |

* cited by examiner

*Primary Examiner* — Terrance L. Kenerly
(74) *Attorney, Agent, or Firm* — Michael Best & Friedrich LLP (57) ABSTRACT

A flat coil includes at least first and second coil layers having the shape of a ring and stacked, each of the first and second coil layers includes a pair of linear portions facing each other in a first direction and a pair of end portions facing each other in a second direction crossing the first direction, and the flat coil is bent on at least one of the end portions. The flat coil is an α-winding coil and is bent toward the first coil layer from the second coil layer. A first end face of the first coil layer in the second direction and a second end face of the second coil layer in the second direction are positioned on the same plane at the end portion to be bent.

20 Claims, 9 Drawing Sheets

COIL AND METHOD OF MANUFACTURING COIL

RELATED APPLICATIONS

Priority is claimed to Japanese Patent Application No. 2014-058936, filed Mar. 27, 2014, and International Patent Application No. PCT/JP2014/058936, the entire content of each of which is incorporated herein by reference.

BACKGROUND

Technical Field

Certain embodiments of the invention relate to a coil and a method of manufacturing a coil.

Description of Related Art

In the related art, a coil formed by the winding of a conductive wire is used as a movable element (driving part) in the field or the like of a linear motor. A combination of a plurality of coils, each of which is formed of a flat coil including a plurality of coil layers having the shape of a ring and stacked, may be used as the coil in this case.

SUMMARY

According to an aspect of the invention, there is provided a method of manufacturing a coil. The method includes: a first step of preparing a flat coil including at least first and second coil layers that have the shape of a ring and are stacked, each of the first and second coil layers including a pair of linear portions facing each other in a first direction and a pair of end portions facing each other in a second direction crossing the first direction; and a second step of bending the flat coil on at least one of the end portions toward the first coil layer from the second coil layer. In the first step, a level difference is formed so that a first end face between the first end face of the first coil layer in the second direction and a second end face of the second coil layer in the second direction is positioned on an inner peripheral side at the end portion to be bent.

According to another aspect of the invention, there is provided a coil that is formed of a flat coil including at least first and second coil layers having the shape of a ring and stacked, each of the first and second coil layers includes a pair of linear portions facing each other in a first direction and a pair of end portions facing each other in a second direction crossing the first direction, and the flat coil is bent on at least one of the end portions. The flat coil is an α-winding coil and is bent toward the first coil layer from the second coil layer, and a first end face of the first coil layer in the second direction and a second end face of the second coil layer in the second direction are positioned on the same plane at the end portion to be bent. Accordingly, even though the radius of curvature of the first coil layer is smaller than the radius of curvature of the second coil layer, a bent portion, which is formed when the flat coil is bent toward the first coil layer from the second coil layer, can be reduced in size and it is possible to suppress an increase in resistance and the generation of heat that is caused by an increase in resistance. Therefore, the performance of the coil can be improved. Further, since the flat coil is an α-winding coil, it is possible to easily connect the conductive wire and to prevent the end portion of the conductive wire from being tangled with an inner wire of the first coil layer or the second coil layer when the flat coil is bent.

DETAILED DESCRIPTION

Here, bent portions, which are formed by bending the end portions so that coils do not interfere with each other when a plurality of coils are combined, need to be formed. The bent portions do not contribute to the thrust of the linear motor, but the bent portions may be increased in size when the flat coil including a plurality of stacked ring-shaped coil layers is bent. Further, when the bent portion is increased in size, the generation of heat caused by an increase in resistance occurs. Eventually, there is a problem in that the performance of the coil deteriorates.

The invention provides a coil of which bent portions, which are formed when a flat coil is bent, can be reduced in size and the performance is improved, and a method of manufacturing the coil.

According to the method of manufacturing a coil of an aspect of the invention, in the first step of preparing the flat coil, a level difference is formed so that a first end face between the first end face of the first coil layer in the second direction and a second end face of the second coil layer in the second direction is positioned on an inner peripheral side at the end portion to be bent. Here, when the flat coil is bent toward the first coil layer from the second coil layer, the radius of curvature of the first coil layer is smaller than that of the second coil layer. Accordingly, the extension length of the first end face in the bending direction is likely to be longer than that of the second end face in the bending direction. However, since the above-mentioned level difference is formed, the extension length of the first end face can be reduced and the bent portion, which is formed when the flat coil is bent, can be reduced in size. Accordingly, since the amount of a conductive wire used for the coil can be reduced, it is possible to suppress an increase in resistance and the generation of heat that is caused by an increase in resistance. Therefore, it is possible to improve the performance of the coil.

In the method of manufacturing a coil according to the aspect of the invention, the magnitude of the level difference may be set so that the first end face and the second end face are positioned on the same plane after the second step. Accordingly, since the bent portions, which are formed when the flat coil is bent, can be further reduced in size, it is possible to suppress an increase in resistance and the generation of heat that is caused by an increase in resistance. Therefore, the performance of the coil can be improved.

In the method of manufacturing a coil according to the aspect of the invention, the flat coil may be an α-winding coil. When the α-winding coil is used, both end portions of a conductive wire used for the coil are led from the outer peripheral side. Accordingly, it is possible to easily connect the conductive wire. Further, it is possible to prevent the end portion of the conductive wire from being tangled with an inner wire of the first coil layer or the second coil layer when the flat coil is bent.

According to the invention, it is possible to provide a coil of which bent portions, which are formed when a flat coil is bent, can be reduced in size and the performance is improved, and a method of manufacturing the coil.

A preferred embodiment of a coil according to an aspect of the invention will be described below with reference to accompanying drawings. The following embodiment is an exemplification that is used to illustrate an aspect of the invention, and the invention is not limited to the following contents. Further, the accompanying drawings show an example of the embodiment, and the form, the dimensions, and the ratio of the coil are not interpreted so as to be limited to the drawings. An aspect of the invention may be appropriately modified within the concept of the invention. Meanwhile, in the following description, the same elements or equivalent elements will be denoted by the same reference numerals and the repeated description thereof will be omitted.

Figure 1:
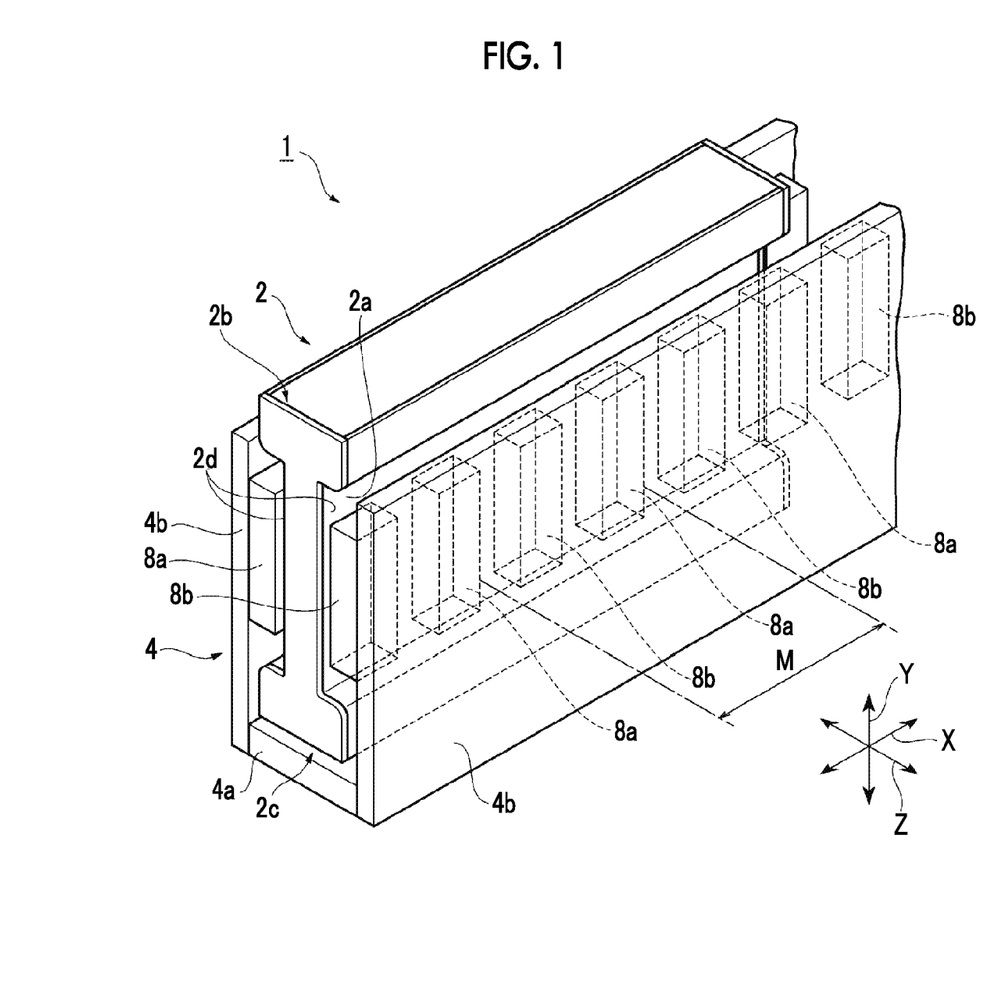
FIG. 1 is a perspective view of a linear motor that uses coils according to an embodiment of the invention.
Figure 2:
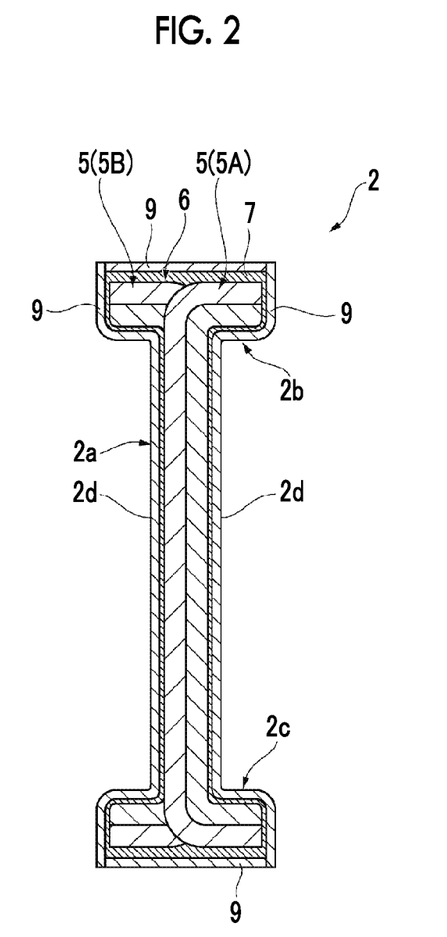
FIG. 2 is a cross-sectional view of a coil section according to the embodiment of the invention.
Figure 3:
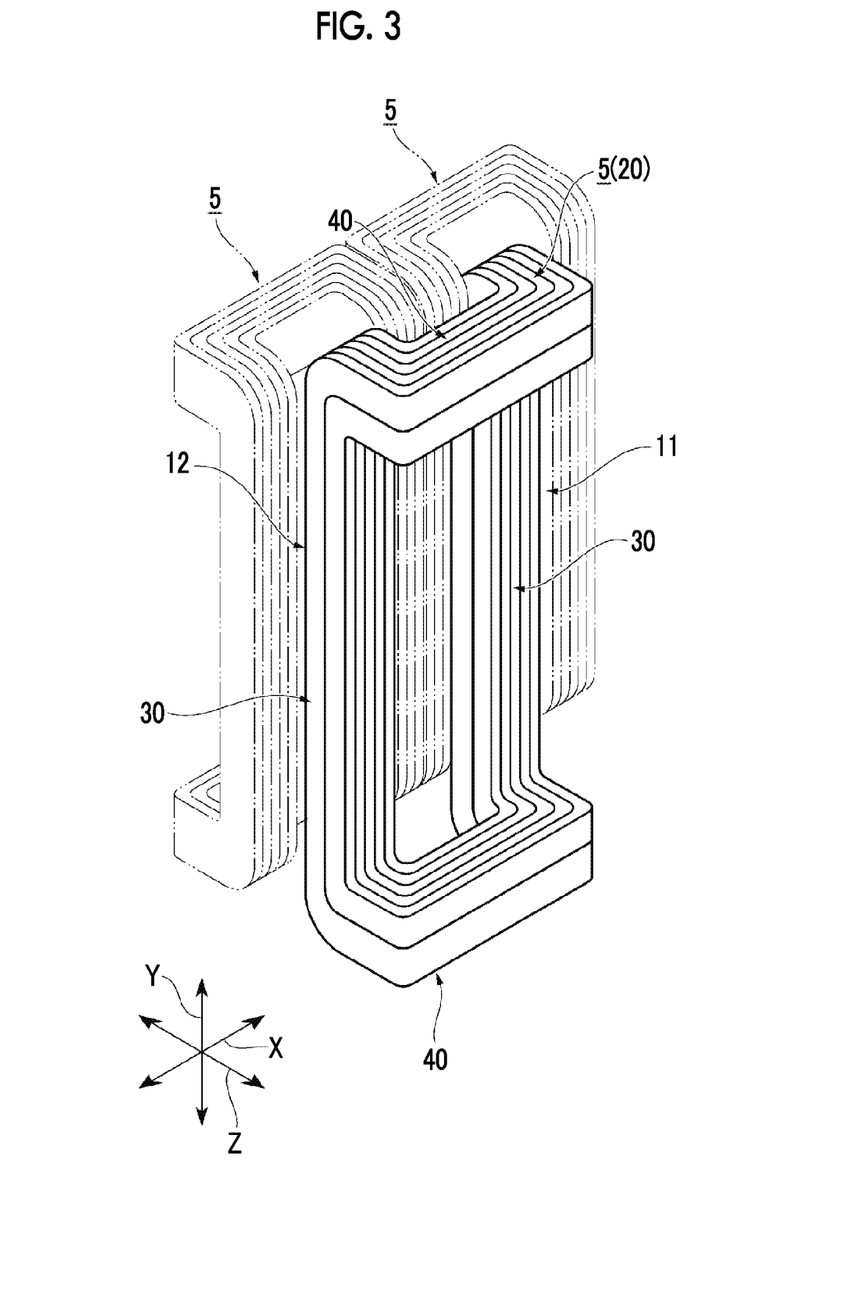
FIG. 3 is a perspective view of the coils according to the embodiment of the invention.

FIG. 1 is a perspective view of a linear motor that uses coils according to an embodiment of the invention. Further, FIG. 2 is a cross-sectional view of a coil section of FIG. 1. FIG. 3 is a perspective view of the coils according to the embodiment of the invention that are provided in the coil section shown in FIG. 1.

As shown in FIG. 1, a linear motor 1 includes a coil section 2 that receives coils 5 (see FIG. 3) and is movable, and a magnet unit 4 that moves the coil section 2 while guiding the coil section 2 in a traveling direction of the coil section 2. Meanwhile, in FIG. 1, the traveling direction of the coil section 2 is defined as an X-axis direction, a vertical direction orthogonal to (crossing) the traveling direction of the coil section 2 is defined as a Y-axis direction, and a horizontal direction orthogonal to (crossing) the traveling direction of the coil section 2 is defined as a Z-axis direction.

The entire surface of a coil unit 6, in which two coil arrays 5A and 5B including a plurality of coils 5 lined up in the X-axis direction are disposed so that the backs of the coil arrays 5A and 5B face each other, is coated with a coil molding (molding material) 7 as shown in FIG. 2 and the coated coil unit 6 is housed in a case 9. As a result, the coil section 2 is formed. Meanwhile, other coils to be combined with one coil 5 are shown in FIG. 3 by an imaginary line. The coil section 2 includes a body portion 2a that extends in the Y-axis direction and upper and lower end portions 2b and 2c that are wider than the body portion 2a in the Z-axis direction, and has a substantially I-shaped cross-section. Further, when current is applied to the coil unit 6, the coil section 2 generates an electromagnetic force and moves in the X-axis direction.

Returning to FIG. 1, the magnet unit 4 has a structure in which a base yoke 4a as a bottom portion and side yokes 4b as both side portions are combined in a U shape. The base yoke 4a is disposed so as to face the lower end portion 2c with a predetermined interval between itself and the lower end portion 2c of the coil section 2. N-pole magnets 8a and S-pole magnets 8b are provided on the inner walls of the side yokes 4b so as to be alternately lined up in the X-axis direction.

These magnets 8a and 8b are disposed so as to face both side surfaces 2d of the body portion 2a of the coil section 2 with predetermined intervals between the side surfaces and themselves. Further, when current is applied to the coil section 2 disposed between the magnets 8a and 8b, the coil section 2 generates an electromagnetic force and moves relative to the magnet unit 4 in the X-axis direction. Meanwhile, in FIG. 1, the pitch of magnets having the same pole is referred to as a pole pitch M.

The structure of the coil 5 will be described here in detail with reference to FIG. 3.

As shown in FIG. 3, a substantially rectangular ring-shaped (in this embodiment, a substantially oblong ring-shaped) flat coil 20 is bent at both end portions thereof in a longitudinal direction (which corresponds to the Y-axis direction in FIG. 3), so that the coil 5 is formed. The flat coil 20 is a plate-like coil in which a first coil layer 11 and a second coil layer 12 are stacked. Meanwhile, the detailed structure of the flat coil 20 will be described below together with a method of manufacturing the coil 5. The coil 5 is a saddle-shaped coil that includes a pair of thrust generating portions 30 corresponding to the body portion 2a of the coil section 2 of the linear motor 1 and a pair of bent portions 40 bent at both end portions of the thrust generating portions 30. The pair of bent portions 40 correspond to the upper end portion 2b and the lower end portion 2c of the coil section 2, respectively.

The pair of thrust generating portions 30 are portions that contribute to the thrust of the linear motor 1, and are a pair of linear portions that face each other in a lateral direction (corresponding to the X-axis direction in FIG. 3) and extend in the longitudinal direction (the Y-axis direction) orthogonal to the lateral direction. Thrust generating portions 30 of other coils 5 are disposed between the pair of linear portions. The bent portions 40 are portions that do not contribute to the thrust of the linear motor 1, and are provided to prevent interference between the coil arrays 5A and 5B that are lined up in the coil unit 6 shown in FIG. 2.

Next, a method of manufacturing the coil 5 and the like will be described with reference to FIGS. 4 to 6.

Figure 4A:
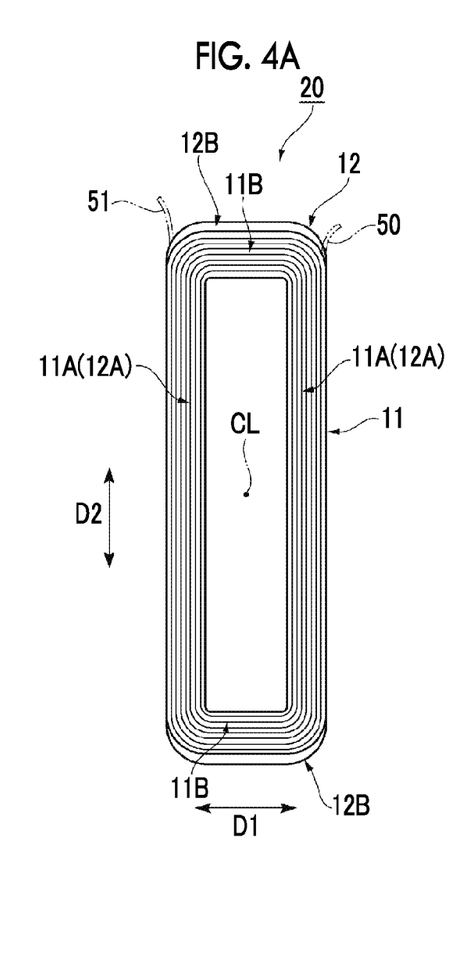
FIGS. 4A-4C are a views illustrating a first step that is a step of preparing a flat coil.
Figure 4B:
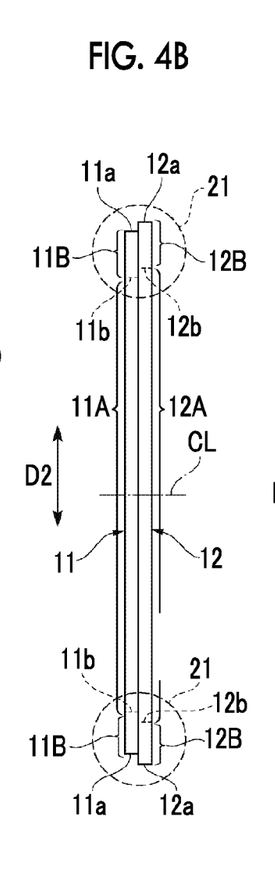
Figure 4C:
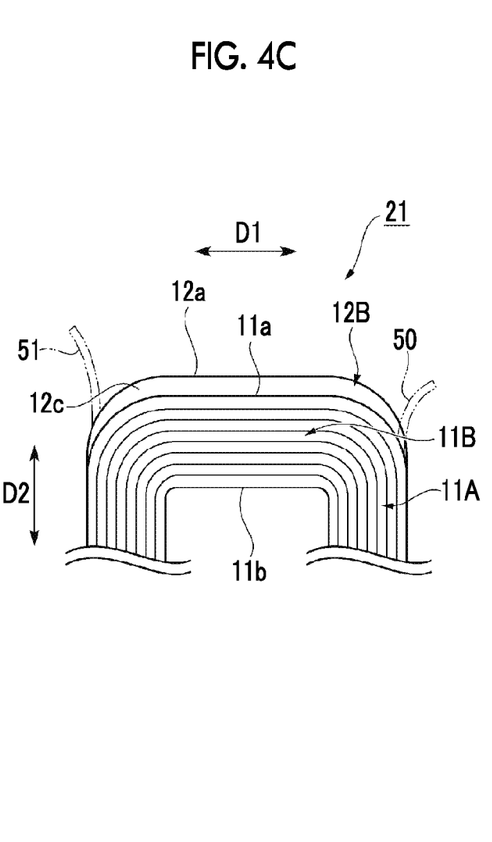

FIGS. 4A-4C are views illustrating a first step that is a step of preparing the flat coil. FIG. 4A is a plan view of the flat coil 20. The flat coil 20 includes a first coil layer 11 and a second coil layer 12 that is formed of a continuous belt-shaped conductive wire wound in the shape of a rectangular ring. The first coil layer 11 and the second coil layer 12 are stacked with each other, and have an oblong ring shape corresponding to substantially the same shape and size when viewed in a stacking direction. Further, the conductive wire of the first coil layer 11 and the second coil layer 12 is wound around the same center line CL. The first coil layer 11 is positioned on the front side of the second coil layer 12 when viewed from the plane of FIG. 4A.

Here, a continuous belt-shaped conductive wire is wound around the center line CL in the shape of a substantially rectangular ring, so that the first and second coil layers 11 and 12 of the flat coil 20 are formed. The flat coil 20 is an α-winding coil of which one end portion (first end portion 50) of the conductive wire extends from the outer peripheral side of the first coil layer 11 and the other end portion (second end portion 51) of the conductive wire extends from the outer peripheral side of the second coil layer 12. Specifically, the first end portion 50 of the conductive wire, which forms the flat coil 20, extends from the outer peripheral side of the first coil layer 11 and the second end portion 51 of the conductive wire extends from the outer peripheral side of the second coil layer 12. Meanwhile, the first and second end portions 50 and 51 are shown in FIGS. 4A and 4C by an imaginary line and are not shown in other drawings so that a characterizing portion of the coil 5 according to this embodiment is easily understood.

The first coil layer 11 includes a pair of linear portions 11A that face each other in a lateral direction D1 (which corresponds to a "first direction" of claims and corresponds to the X-axis direction in FIG. 3) and extend in a longitudinal direction D2 (which corresponds to a "second direction" of claims and corresponds to the Y-axis direction in FIG. 3) orthogonal to the lateral direction D1, and a pair of end portions 11B that face each other in the longitudinal direction D2. The linear portions 11A correspond to long sides of the oblong ring-shaped first coil layer 11, and the end portions 11B correspond to short sides thereof. Meanwhile, the end portions 11B are portions of the flat coil 20 except for the linear portions 11A, and each of the end portions 11B includes a portion that linearly extends in the lateral direction D1 and curved portions that correspond to corners. Since the width of the linear portion 11A and the width of the end portion 11B are determined depending on the thickness of the belt-shaped conductive wire and the number of turns of the belt-shaped conductive wire, the width of the linear portion 11A is the same as the width of the end portion 11B.

The second coil layer 12 is formed by the same method as the method of forming the first coil layer 11. The second coil layer 12 includes a pair of linear portions 12A that face each other in the lateral direction D1 and extends in the longitudinal direction D2, and a pair of end portions 12B that face each other in the longitudinal direction D2. Meanwhile, a correspondence relationship between the linear portion 12A and the end portion 12B is the same as that of the first coil layer 11, and the width of the linear portion 12A is the same as the width of the end portion 12B. Further, the number of turns of the conductive wire of the second coil layer 12 is the same as the number of turns of the conductive wire of the first coil layer 11.

As shown in FIG. 4A, the length of the first coil layer 11 in the lateral direction D1 (that is, the length of the end portion 11B in the lateral direction D1) is the same as the length of the second coil layer 12 in the lateral direction D1 (that is, the length of the end portion 12B in the lateral direction D1). Further, since the conductive wire is wound around the same center line CL so that the number of turns of the conductive wire of the first coil layer 11 is the same as the number of turns of the conductive wire of the second coil layer 12, the width of the linear portion 11A of the first coil layer 11 is the same as the width of the linear portion 12A of the second coil layer 12. Accordingly, the inner peripheral surface of the linear portion 11A and the inner peripheral surface of the linear portion 12A are formed so as to be positioned on the same plane. Further, the outer peripheral surface of the linear portion 11A and the outer peripheral surface of the linear portion 12A are formed so as to be positioned on the same plane. Here, "positioned on the same plane" means that the position of the peripheral surface has a slight deviation, such as a manufacturing error, without being limited to the meaning that the peripheral surface is completely positioned on the same plane.

FIG. 4B is a side view of the flat coil 20. As shown in FIG. 4B, the length of the first coil layer 11 in the longitudinal direction D2 (that is, the sum of the length of the linear portion 11A in the longitudinal direction D2 and the widths of the pair of end portions 11B) is shorter than the length of the second coil layer 12 in the longitudinal direction D2 (that is, the sum of the length of the linear portion 12A in the longitudinal direction D2 and the widths of the pair of end portions 12B). Since the width of the end portion 11B is the same as the width of the end portion 12B as described above, the length of the linear portion 11A in the longitudinal direction D2 is shorter than the length of the linear portion 12A in the longitudinal direction D2. Accordingly, a deviation (a first level difference) is formed between a first end face 11a that is the outer peripheral surface of the end portion 11B in the longitudinal direction D2 and a second end face 12a that is the outer peripheral surface of the end portion 12B in the longitudinal direction D2.

Further, since the width of the end portion 11B is the same as the width of the end portion 12B as described above, a deviation (a second level difference) is also formed between a first inner peripheral surface 11b that is the inner peripheral surface of the end portion 11B in the longitudinal direction D2 and a second inner peripheral surface 12b that is the inner peripheral surface of the end portion 12B in the longitudinal direction D2. Meanwhile, since the width of the end portion 11B is the same as the width of the end portion 12B, the amount of deviation between the first end face 11a and the second end face 12a is the same as the amount of deviation between the first inner peripheral surface 11b and the second inner peripheral surface 12b. Here, the vicinities of portions where the first and second level differences are formed are referred to as stepped portions 21.

FIG. 4C is an enlarged plan view of one stepped portion 21. As shown in FIG. 4C, a distance between the first end face 11a and the center line CL in the longitudinal direction D2 is shorter than a distance between the second end face 12a and the center line CL in the longitudinal direction D2. That is, in regard to the flat coil 20, the first end face 11a is positioned closer to the inner peripheral side than the second end face 12a. Likewise, a distance between the first inner peripheral surface 11b and the centerline CL in the longitudinal direction D2 is also shorter than a distance between the second inner peripheral surface 12b and the center line CL in the longitudinal direction D2. Further, when viewed from the first coil layer 11 in the stacking direction, the second coil layer 12 has an exposed surface 12c that is exposed from the first coil layer 11.

Figure 5A:
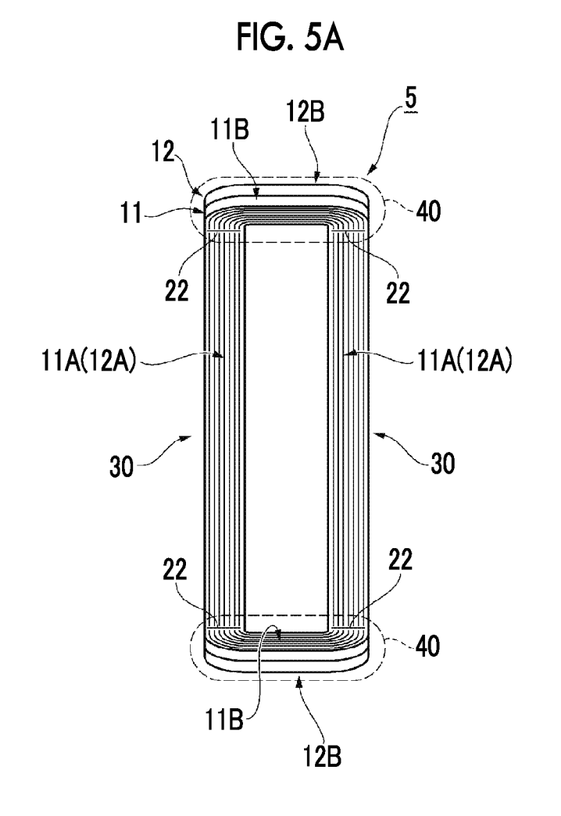
FIGS. 5A and 5B are views illustrating a second step that is a step of bending the flat coil.
Figure 5B:
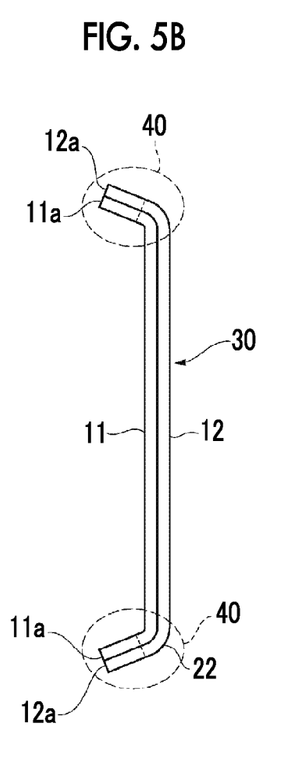

FIGS. 5A and 5B are views illustrating a second step that is a step of bending the flat coil. FIG. 5A is a plan view of the coil 5 that is formed by the bending of the flat coil 20. FIG. 5B is a side view of the coil 5. FIG. 6 is an enlarged view of one bent portion of the FIG. 5B. In the second step, the flat coil 20 is bent at both the end portions 11B and 12B toward the first coil layer 11 from the second coil layer 12. In the second step, the flat coil 20 is bent in an arc shape at fold lines 22 that are set at predetermined positions (or boundary positions between the linear portions 11A (12A) and the end portions 11B (12B)) on both sides of the linear portions 11A and 12A in the longitudinal direction D2. The angle of the bending of the flat coil 20 is not limited to an angle shown in FIG. 5A as long as the interference between the adjacent coils 5 is avoided. For example, the first and second coil layers 11 and 12 may be bent so that a point P1, which is present on the second inner peripheral surface 12b shown in FIG. 6 and corresponds to the side of the second coil layer 12, is positioned on the side of a line L1 corresponding to the first coil layer 11. Further, the angle of the bending of the flat coil 20 may be set to an angle within a range of 90° with respect to the linear portion 11A (12B). The above-mentioned coil 5 including the thrust generating portions 30 and the bent portions 40 is formed by the second step. Meanwhile, the thrust generating portions 30 correspond to the linear portions 11A and 12A, and the bent portions 40 correspond to the end portions 11B and 12B.

As shown in FIG. 5B, the first level difference (see FIG. 4B), which is formed by the first end face 11a and the second end face 12a of the stepped portion 21 formed at the flat coil 20, is removed by the bending of the flat coil 20. That is, when the flat coil 20 is bent, the exposed surface 12c of the second coil layer 12 is covered with the surface of the first coil layer 11, which faces the second coil layer 12 in the stacking direction, and is hidden. Furthermore, the second level difference, which is formed by the first inner peripheral surface 11b and the second inner peripheral surface 12b, is also removed by the bending of the flat coil 20.

Figure 6:
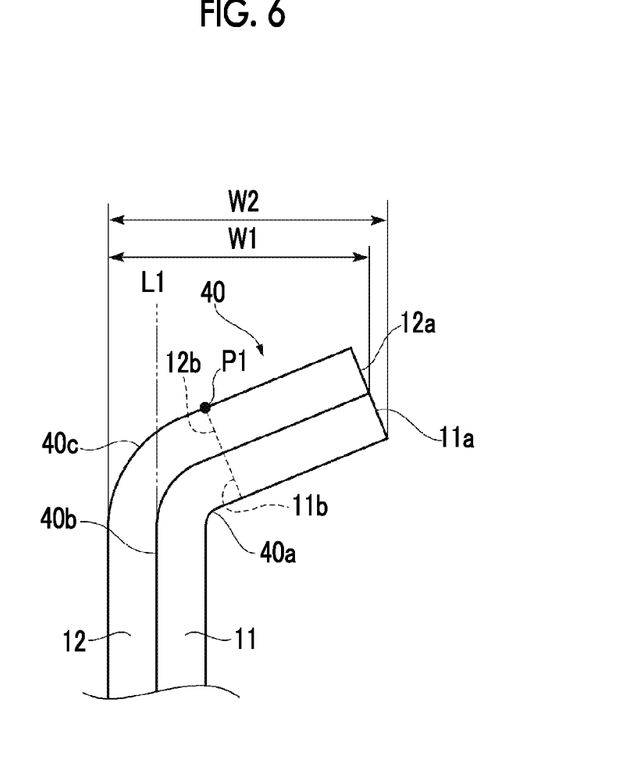
FIG. 6 is an enlarged view of one bent portion of the coil.

In FIG. 6, the surface of the first coil layer 11, which is opposite to the second coil layer 12, of the surfaces, which face each other in the stacking direction, of the first coil layer 11 is referred to as a first surface 40a; a surface where the first coil layer 11 and the second coil layer 12 are joined to each other is referred to as a joining surface 40b; and the surface of the second coil layer 12, which is opposite to the first coil layer 11, of the surfaces, which face each other in the stacking direction, of the second coil layer 12 is referred to as a second surface 40c.

The radii of curvature of the first surface 40a, the joining surface 40b, and the second surface 40c near the fold line 22 satisfy a relationship of "the radius of curvature of the first surface 40a<the radius of curvature of the joining surface 40b<the radius of curvature of the second surface 40c". Accordingly, in consideration of this difference in the radius of curvature, a difference between the radius of curvature of the first coil layer 11 and the radius of curvature of the second coil layer 12 is set to the magnitude of the first level difference, which is formed by the first end face 11a and the second end face 12a shown in FIG. 4B. Therefore, after the flat coil 20 is bent, the first end face 11a and the second end face 12a can be positioned on the same plane. Accordingly, when the above-mentioned level difference is formed, a difference between a maximum distance W1 between the second end face 12a and the second surface 40c after the bending of the flat coil 20 as shown in FIG. 6 and a maximum distance W2 between the first end face 11a and the second surface 40c after the bending of the flat coil 20 is reduced. As a result, the bent portions 40, which are formed when the flat coil 20 is bent, can be reduced in size.

A coil produced in the related art will be described here with reference to FIGS. 7A to 9.

Figure 7A:
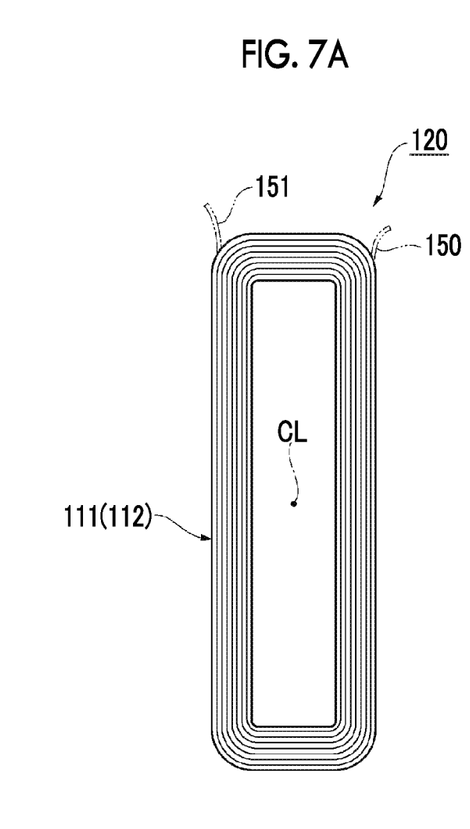
FIGS. 7A-7C are views illustrating a first step that is a step of preparing a flat coil in the related art.
Figure 7B:
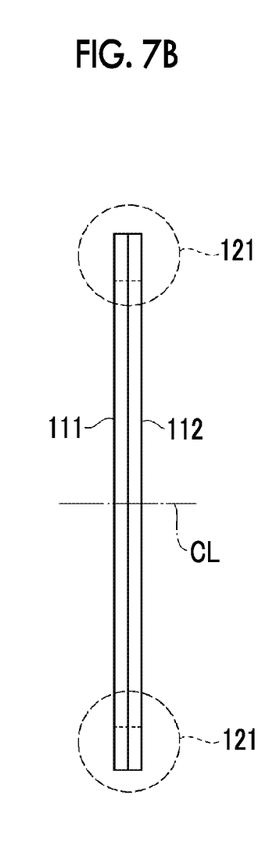
Figure 7C:
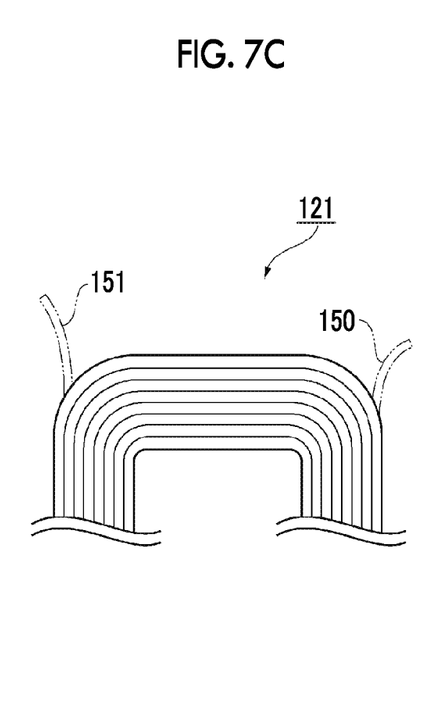

FIGS. 7A-7C are views illustrating a first step that is a step of preparing a flat coil in the related art. A flat coil 120 in the related art has the same shape as the flat coil 20 shown in FIG. 4 except that the size of a first coil layer 111 is the same as the size of a second coil layer 112, and is produced by the same method as the method of manufacturing the flat coil 20. Accordingly, the inner peripheral surface of the first coil layer 111 and the inner peripheral surface of the second coil layer 112 are formed so as to be positioned on the same plane, and the outer peripheral surface of the first coil layer 111 and the outer peripheral surface of the second coil layer 112 are formed so as to be positioned on the same plane.

Figure 8A:
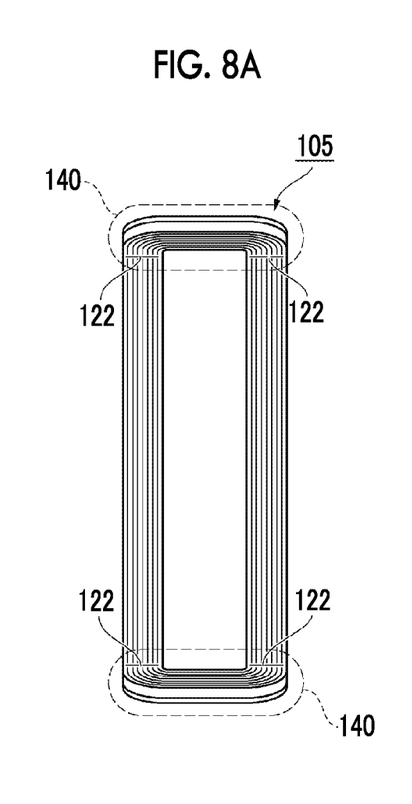
FIGS. 8A and 8B are views illustrating a second step that is a step of bending the flat coil in the related art.
Figure 8B:
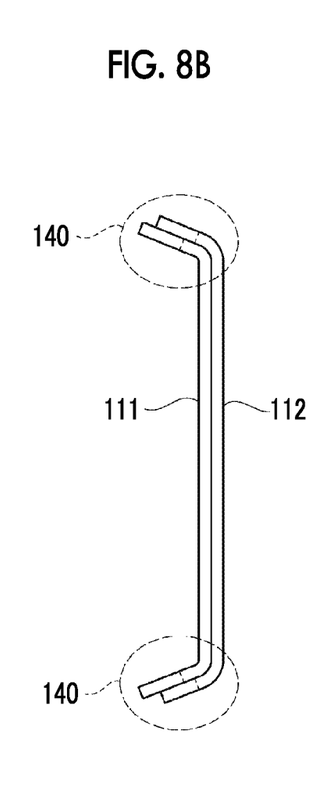

FIGS. 8A and 8B are views illustrating a second step that is a step of bending the flat coil in the related art. As shown in FIGS. 8A and 8B, the flat coil 120 is bent at fold lines 122 toward the first coil layer 111 from the second coil layer 112 as in the step of bending the flat coil 20. A coil 105 including bent portions 140 is formed by this step.

Figure 9:
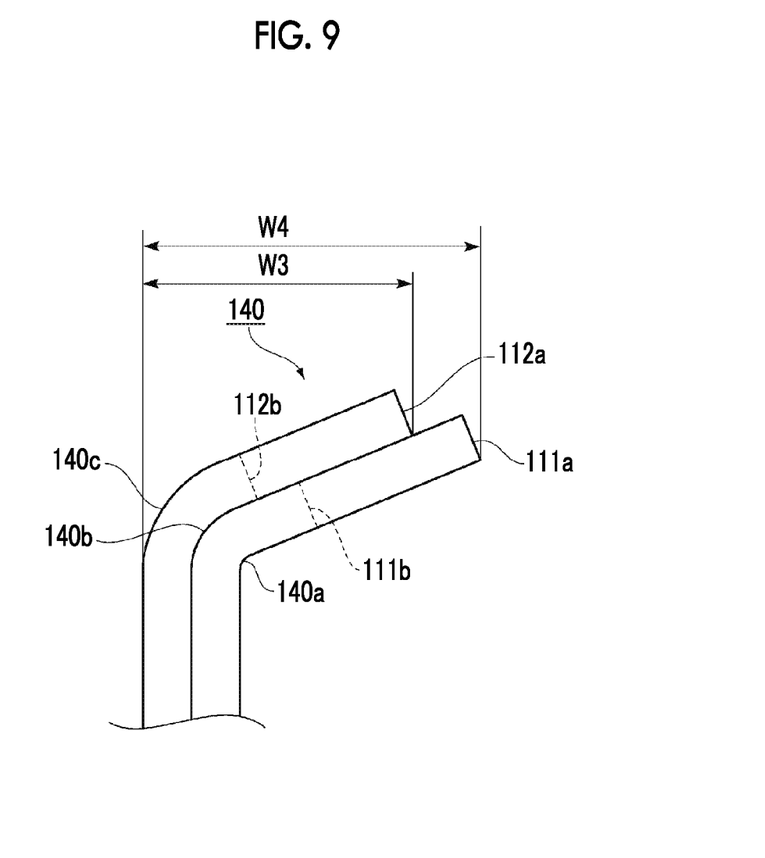
FIG. 9 is an enlarged view of one bent portion of the coil in the related art.

FIG. 9 is an enlarged view of one bent portion 140 of FIG. 8B. The first coil layer 111 and the second coil layer 112 have the same size as described above. For this reason, since the radius of curvature of the first coil layer 111 and the radius of curvature of the second coil layer 112 at the time of bending of the flat coil are different from each other, the extension length of the first coil layer 111 is longer than that of the second coil layer 112 and the first coil layer 111 protrudes. Accordingly, a first end face 111a of the first coil layer 111 of the bent portion 140 and a second end face 112a of the second coil layer 112 are not positioned on the same plane.

Therefore, when the surface of the second coil layer 112, which is opposite to the first coil layer 111 after the bending of the flat coil, of the surfaces, which face each other in the stacking direction, of the second coil layer 112 is referred to as a second surface 140c as shown in FIG. 9, a difference between a maximum distance W3 between the second end face 112a and the second surface 140c after the bending of the flat coil and a maximum distance W4 between the first end face 111a and the second surface 140c after the bending of the flat coil is increased. That is, the bent portions 140, which are formed when the flat coil 120 is bent, can be increased in size. Here, when the size of the second coil layer 112 is the same as the size of the second coil layer 12 of this embodiment, it is understood that a difference between W3 (=W1) and W4 is larger than a difference between W1 and W2. For this reason, since the bent portions 140, which do not contribute to the thrust of a linear motor, become larger than necessary when the coil 105 in the related art is used, the size of the coil 105 is increased and the generation of heat and the like caused by an increase in resistance occur.

Accordingly, according to the method of manufacturing the above-mentioned coil according to this embodiment, in the first step of preparing the flat coil 20, a level difference is formed so that the first end face 11a between the first end face 11a of the first coil layer 11 in the longitudinal direction D2 (the second direction) and the second end face 12a of the second coil layer 12 in the longitudinal direction D2 (the second direction) is positioned on the inner peripheral side at the end portions to be bent. Since the level difference is formed, the extension length of the first end face 11a can be reduced and the bent portions 40, which are formed when the flat coil 20 is bent, can be reduced in size. That is, since a difference between the radius of curvature of the first coil layer 11 and the radius of curvature of the second coil layer 12 is considered in the method of manufacturing the coil according to this embodiment, it is possible to suppress an increase in the size of the bent portion 40, which does not contribute to the thrust of the linear motor 1, more than necessary. Accordingly, since the amount of a conductive wire used for the flat coil 20 can be reduced, it is possible to suppress an increase in resistance and the generation of heat that is caused by an increase in resistance. Therefore, it is possible to provide a coil having improved performance. Further, the above-mentioned effect can be obtained from the coil that is manufactured using this method.

Furthermore, the magnitude of the level difference may be set so that the first end face 11a and the second end face 12a are positioned on the same plane after the second step. Accordingly, since the bent portions 40, which are formed when the flat coil 20 is bent, can be further reduced in size, it is possible to suppress an increase in resistance and the generation of heat that is caused by an increase in resistance. Therefore, the performance of the coil can be improved.

Moreover, the flat coil 20 may be an α-winding coil. When the α-winding coil is used, both end portions of a conductive wire used for the coil are led from the outer peripheral side. Accordingly, it is possible to easily connect the conductive wire. Further, it is possible to prevent the end portion of the conductive wire from being tangled with an inner wire of the first coil layer 11 or the second coil layer 12 when the flat coil 20 is bent.

Meanwhile, a preferred embodiment of an aspect of the invention has been described, but the invention is not limited to the above-mentioned embodiment. For example, both end portions of the flat coil 20 in the longitudinal direction have been bent in this embodiment, but only one end portion of the flat coil 20 may be bent. In this case, the outer peripheral surfaces and the inner peripheral surfaces of the first coil layer and the second coil layer at an end portion, which is not bent, may be formed so as to be positioned on the same planes.

Further, the flat coil 20 is not necessarily limited to an α-winding coil, and, for example, the first coil layer and the second coil layer may be formed of different wound conductive wires. Meanwhile, the flat coil 20 does not necessarily need to be formed so as to have two layers, and may be formed so as to have three or more layers.

The substantially rectangular ring-shaped flat coil has been exemplified as the flat coil 20. However, as long as the respective coil layers 11 and 12 include at least linear portions 11A and 12A, the shapes of the end portions 11B and 12B are not particularly limited. For example, the end portions 11B and 12B may be formed in a semicircular shape or an arc shape and may be formed in a substantially triangular shape.

According to the invention, the invention can be applied to a coil of which bent portions, which are formed when a flat coil is bent, can be reduced in size and the performance is improved, and a method of manufacturing the coil. Further, the coil is not limited to a linear motor and can be applied to other uses (for example, an electric motor, a generator, a damper, and the like).

It should be understood that the invention is not limited to the above-described embodiment, but may be modified into various forms on the basis of the spirit of the invention. Additionally, the modifications are included in the scope of the invention.

What is claimed is:

1. A flat coil comprising:
   a ring-shaped first coil layer, the first coil layer is a continuous belt-shaped conductive wire wound in the shape of a first rectangular ring; and
   a ring-shaped second coil layer, the second coil layer is another continuous belt-shaped conductive wire wound in the shape of a second rectangular ring,
   wherein the first coil layer is stacked onto the second coil layer in a side view of the flat coil, a length of the second coil layer in the side view of the flat coil is longer than a length of the first coil layer.

2. The flat coil according to claim 1, wherein the flat coil is an α-winding coil.

3. The flat coil according to claim 1, wherein the first coil layer comprises first end portions and first linear portions.

4. The flat coil according to claim 3, wherein the first end portions extend from one of the first linear portions to another of the first linear portions.

5. The flat coil according to claim 3, wherein the first linear portions extend from one of the first end portions to another of the first end portions.

6. The flat coil according to claim 3, wherein the second coil layer comprises second end portions and second linear portions.

7. The flat coil according to claim 6, wherein the second end portions extend from one of the second linear portions to another of the second linear portions.

8. The flat coil according to claim 6, wherein the second linear portions extend from one of the second end portions to another of the second end portions.

9. A method of manufacturing a coil, the method comprising:
   a step of stacking a ring-shaped first coil layer onto a ring-shaped second coil layer in a side view of the flat coil, a length of the second coil layer in the side view of the flat coil is longer than a length of the first coil layer,
   wherein the first coil layer is a continuous belt-shaped conductive wire wound in the shape of a first rectangular ring, the second coil layer is another continuous belt-shaped conductive wire wound in the shape of a second rectangular ring.

10. The method according to claim 9, wherein the flat coil is an α-winding coil.

11. The method according to claim 9, wherein the first coil layer comprises first end portions and first linear portions, the first end portions extend from one of the first linear portions to another of the first linear portions.

12. The method according to claim 11, wherein the first linear portions extend from one of the first end portions to another of the first end portions.

13. The method according to claim 11, wherein the second coil layer comprises second end portions and second linear portions, the second end portions extend from one of the second linear portions to another of the second linear portions.

14. The method according to claim 13, wherein the second linear portions extend from one of the second end portions to another of the second end portions.

15. The method according to claim 13, further comprising:
   a step of bending the one of the second end portions toward the first coil layer, the step of stacking is performed before the step of bending.

16. The method according to claim 15, wherein the one of the first end portions is bent during the step of bending.

17. The method according to claim 15, wherein the one of the first end portions and the one of the second end portions are simultaneously bent during the step of bending.

18. The method according to claim 15, wherein the length of the first coil layer is a distance from one end face of the first coil layer to another end face of the first coil layer and the length of the second coil layer is a distance from one end face of the second coil layer to another end face of the second coil layer.

19. The method according to claim 18, wherein a level difference is formed so that the one end face of the first coil layer and the one end face of the second coil layer are positioned on an inner peripheral side at the one of the second end portions.

20. The method according to claim 19, wherein a magnitude of the level difference is set so that the one end face of the first coil layer and the one end face of the second coil layer are positioned on a same plane after the step of bending.

* * * * *